No. 864,068. PATENTED AUG. 20, 1907.
A. P. BJERREGAARD.
MANUFACTURE OF CEMENT AND OTHER PRODUCTS.
APPLICATION FILED MAY 7, 1907.
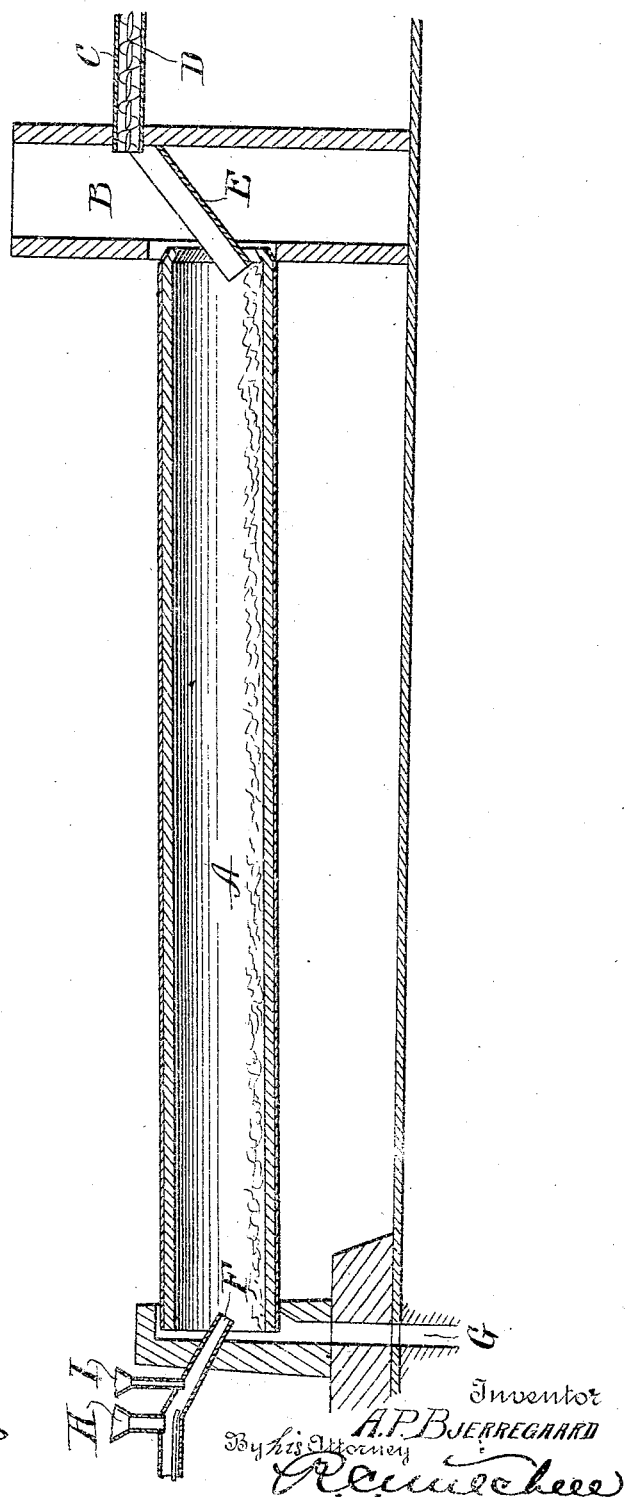

UNITED STATES PATENT OFFICE.

AUGUST P. BJERREGAARD, OF MINEOLA, NEW YORK, ASSIGNOR OF ONE-HALF TO ROBERT C. MITCHELL, OF MOUNT VERNON, NEW YORK.

MANUFACTURE OF CEMENT AND OTHER PRODUCTS.

No. 864,068.   Specification of Letters Patent.   Patented Aug. 20, 1907.

Application filed May 7, 1907. Serial No. 372,431.

*To all whom it may concern:*

Be it known that I, AUGUST P. BJERREGAARD, a citizen of the United States, residing at Mineola, Nassau county, New York, have invented certain new and useful Improvements in Manufacture of Cement and other Products, of which the following is a full, clear, and exact description.

My invention relates to the regulation of flames produced by the burning of a blast of coal dust, oil, or other suitable fuel.

It is well suited for the manufacture of Portland cement, although, in its broadest aspects, it is not confined to this particular manufacture.

It secures the greatest effectiveness and economy in the manufacture of cement or lime, or in the heating of ores and the like.

It is effective in that the flame may, without danger to the apparatus employed, be projected directly against the material to be acted upon.

It is economical in that it avoids the waste of heat.

It is a well-known fact that some bodies (for example all carbonates) give off, when heated, carbondioxid with the absorption of heat; that some other bodies (for example clay) give off water when highly heated with the absorption of heat; that carbon-dioxid when highly heated in the presence of carbonaceous fuel becomes converted into carbon-monoxid with the absorption of heat; that water vapor highly heated in the presence of carbonaceous fuel produces a mixture of hydrogen and carbon-monoxid; and that the hydrogen and carbon-monoxid so produced, when highly heated and permitted to come into contact with atmospheric air, burn with the generation of heat. In the present invention, these properties are utilized by injecting into or otherwise supplying, in any suitable manner, to the blast flame, preferably at or near its origin, a finely powdered substance such as limestone or clay, or a mixture of these, or any similarly acting substance, whereby the finely powdered carbon dioxid gas or water vapor producing substance is distributed through the flame to reduce its intensity to the desired degree. The heat thus abstracted from the flame is not wasted but serves the useful purpose of causing chemical action upon the material injected into the flame, and at the same time of indirectly producing a combustible gas, by the action of the liberated carbon dioxid and water vapor on the incandescent carbonaceous fuel of the flame. When this gas has proceeded sufficiently beyond the point of impact with the material being heated in the furnace, it will burn with the evolution of heat to heat the material in the kiln adjacent thereto. Furthermore, the non-volatile residue from the flame-reducing material will become highly heated in the flame and the particles thereof will impinge in this highly heated condition upon the material in the furnace, so that it will adhere thereto, thus augmenting the bulk of the latter. Some materials that do not become adhesive may be carried by the gases further along in the furnace where they will partly deposit on the material to be heated. Any surplus will be carried out through the furnace and caught by the usual dust-collecting chambers.

It will be seen that by this invention the heat generated by the combustion of the fuel can be carefully regulated and so completely utilized that the greatest economies and advantages will be attained.

To indicate one of the many practical uses of this invention we may describe the same in connection with the manufacture of Portland cement in a kiln such as illustrated in the accompanying drawing, in which I have shown conventionally and in section, an ordinary cement kiln.

A represents the inclined furnace or body of the kiln, provided with the usual fire resistant lining. This body is agitated or revolved about its longitudinal axis during the progress of the cement making, any suitable means (not shown) being provided to produce this movement of the kiln.

B is a rear hood or outlet flue.

C is a supply pipe through which the raw cement material to be acted upon is fed into the body A by means of the usual worm-screw D.

E is the usual chute for conducting the cement material from the worm D to the main body A. As the main body A is agitated or revolved, this cement material moves toward the lower end. Projecting into the lower end of the body A is a blast burner F. This burner inclines downwardly so as to project the flame therefrom directly against the forming cement clinker contained in the bottom of the body.

G is the usual outlet for the clinker after it leaves the body.

H—I are any suitable feeders or hoppers opening into the burner nozzle at a suitable distance to the rear of the discharge end thereof. These feeders hold the material which supply the flame, said material being supplied to the flame in proper proportions and at proper speed, any suitable regulating devices being provided for that purpose.

The construction of the burner, as well as the construction of all of the other parts, may be modified at will, the illustration being merely for the purpose of facilitating the description of the process.

For the application of my process to other manufacturing purposes, a similar, or any other suitable apparatus, may be employed.

In the case of the manufacture of cement, the material to be injected into the flame to regulate its intensity may be a pulverized raw cement mixture, such as is fed into the furnace at its higher end. Finely powdered coal is usually the fuel employed. This pulverized raw cement material may be either previously mixed with the pulverized coal, or, the coal may be fed through one hopper H, and the pulverized raw cement material may be fed through the other hopper I. In either case, the finely powdered cement material (ordinarily some form of limestone and clay) will become, while in the body of the flame, highly heated and the carbon dioxid and water vapor generated will reduce the intensity and increase the volume of the flame. Of course, the proportion of raw cement flour thus used should be such that the impinging flame will be hot enough to produce the desired clinker and yet not hot enough to injure the kiln, or the lining thereof. The carbon dioxid and water vapor. set free from the saw cement flour in the flame jet, will, on account of the intense heat therein, become reduced by the carbonaceous fuel to carbon-monoxid and hydrogen, also with the absorption of heat, and by these transformations the temperature of the flame jet will be modified to the desired degree. The hot gaseous mass, rebounding from the point of impingement, will proceed along the kiln and its progress will finally meet that part of the atmospheric air which up to that point has not as yet been in direct contact with the flame, and will then burn, thereby generating a large flame of relatively low intensity. This heat will raise the temperature of the stream of cement material proceeding down through the kiln body, thus driving the carbon dioxid and water therefrom, before it reaches the clinker-forming zone.

While the invention will be of great use in the manufacture of cement, its use is by no means limited thereto. Any material which can be finely pulverized and which, when highly heated, sets free carbon dioxid gas or water vapor, or both, and which can be injected into the heating flame, may be utilized in this process; for example, limestone in the manufacture of lime, and many metallic ores containing chemically combined water or carbon dioxid, or both. The substance introduced into the flame need not necessarily be the same which is being heated in the furnace.

In the accompanying claims, the term "non-combustible gas" is meant to include carbon dioxid gas, or water vapor, or a mixture of these.

What I claim is—

1. A process of modifying the intensity of a blast flame, consisting in introducing into said flame at or near its point of origin a finely divided solid material capable of generating in the flame a non-combustible gas, with the absorption of heat.

2. A process of modifying the intensity of a blast flame in making cement, consisting in introducing into said flame at or near its origin, a suitable quantity of finely pulverized raw cement material.

3. A process for moderating the intensity of a blast flame used in heating materials highly, consisting in introducing into said flame at or near its point of origin, a suitable proportion of a finely pulverized solid material capable of generating in the flame a non-combustible gas with the absorption of heat.

4. A process for moderating the intensity of a blast flame used in heating cement material, consisting in introducing into the said flame at or near its point of origin, a suitable proportion of a finely pulverized solid material capable of generating in the flame a non-combustible gas with the absorption of heat.

5. A process of modifying the intensity of a blast flame, consisting in introducing into said flame at or near its point of origin a finely divided solid material capable of generating in the flame a non-combustible gas, with the absorption of heat, and subsequently transforming the same into a combustible gas.

6. A process for moderating the intensity of a blast flame used in heating materials highly, consisting in introducing into said flame at or near its point of origin, a suitable proportion of a finely pulverized solid material capable of generating in the flame a non-combustible gas with the absorption of heat, and subsequently transforming the same into a combustible gas.

7. A process for moderating the intensity of a blast flame used in heating cement material, consisting in introducing into the said flame at or near its point of origin, a suitable proportion of a finely pulverized solid material capable of generating in the flame a non-combustible gas with the absorption of heat, and subsequently transforming the same into a combustible gas.

8. A process of manufacturing cement, comprising the subjecting of the cement material to a blast flame and introducing into said flame material to absorb a portion of the heat thereof, said material being of a character to augment the clinker being formed.

9. A process of manufacturing cement, comprising the subjecting of the cement material to a blast flame and introducing into said flame material to absorb a portion of the heat thereof, said material being of a character to augment the clinker being formed, said material also generating a non-combustible gas while in said flame, said gas mingling with air after leaving said flame to form a combustible product.

AUGUST P. BJERREGAARD.

Witnesses:
R. C. MITCHELL,
LLEWELLYN BURT.